(12) United States Patent
Jacomine et al.

(10) Patent No.: US 12,144,274 B2
(45) Date of Patent: Nov. 19, 2024

(54) DEVICE FOR ADJUSTING THE ANGLE FOR DISC SECTIONS FOR AGRICULTURAL HARROWS, AND AGRICULTURAL HARROW

(71) Applicant: Marchesan Implementos e Máquinas Agrícolas Tatu S.A., Matão (BR)

(72) Inventors: Sebastião Antonio Jacomine, Matão (BR); Carlos Cesar Galhardi, Matão (BR)

(73) Assignee: MARCHESAN IMPLEMENTOS E MÁQUINAS AGRICOLAS TATU S.A., Matão (BR)

( * ) Notice: Subject to any disclaimer, the term of this patent is extended or adjusted under 35 U.S.C. 154(b) by 400 days.

(21) Appl. No.: 17/558,792

(22) Filed: Dec. 22, 2021

(65) Prior Publication Data

US 2022/0192074 A1    Jun. 23, 2022

(30) Foreign Application Priority Data

Dec. 22, 2020    (BR) .......................... 102020026399-4

(51) Int. Cl.
*A01B 63/24*    (2006.01)
*A01B 21/08*    (2006.01)
*A01B 63/26*    (2006.01)

(52) U.S. Cl.
CPC .......... *A01B 63/245* (2013.01); *A01B 21/083* (2013.01); *A01B 63/26* (2013.01)

(58) Field of Classification Search
CPC ...... A01B 63/245; A01B 63/26; A01B 21/083
See application file for complete search history.

(56) References Cited

U.S. PATENT DOCUMENTS

| | | | |
|---|---|---|---|
| 2,163,818 A | 6/1939 | White | |
| 2,600,331 A | 6/1952 | Rude | |
| 2,638,726 A | 5/1953 | Sawyer | |
| 3,630,291 A * | 12/1971 | Womble et al. | A01B 21/083 172/581 |
| 5,558,164 A * | 9/1996 | Clymer | A01B 73/02 16/371 |

FOREIGN PATENT DOCUMENTS

DE    1007096 B    12/1953

* cited by examiner

*Primary Examiner* — Tara Mayo
(74) *Attorney, Agent, or Firm* — Alston & Bird LLP

(57) ABSTRACT

Presently described is a device (1) for adjusting the angle of disc sections for agricultural harrows which comprises at least one articulation element (10) configured to be pivotally attached to a beam (200) of an agricultural harrow (2), the articulation element (10) being configured to be pivotally attached to an adjustment shaft (20), thus allowing the angular adjustment of the beams of the agricultural harrow sections in both a horizontal plane and a vertical/transverse plane, comprising simple construction when compared to solutions existing in the prior art, making use of few components to allow both adjustments, and providing simple, practical and fast operation, requiring few manipulation steps.

11 Claims, 8 Drawing Sheets

DEVICE FOR ADJUSTING THE ANGLE FOR DISC SECTIONS FOR AGRICULTURAL HARROWS, AND AGRICULTURAL HARROW

CROSS REFERENCE TO RELATED APPLICATIONS

This application claims priority to and the benefit of Brazilian Applications No. 102020026399-4, filed Dec. 22, 2020; the contents of which as are hereby incorporated by reference in their entirety.

BACKGROUND

Technical Field

The present invention relates to a device particularly applied to agricultural harrows in tandem (or in "X"), which allows the adjustment of the transversal and longitudinal angle of the disc sections of said agricultural harrow.

Description of Related Art

Tandem (or "X") type agricultural harrows are usually made up of four sections or sets of opposing discs and supported by disc carrier chassis joined to a main structure, which may have a provision to receive transport wheels, in addition to the means coupling to a hauling source. As an example of this type of agricultural harrow, document MU7802612-1 is cited.

Examples of tandem harrows with possibilities for adjusting the working angles or with simple flexibility to follow the variation of the soil profile can be seen in documents U.S. Pat. Nos. 2,163,818; 2,638,726; 2,600,331 and DE1007096; which, however, lack satisfactory performance at higher working speeds due to the effects of vibrations and bumps to which the equipment is subjected, in addition to having a difficult construction and operation of the mechanisms for regulating these working angles in the different planes mentioned.

BRIEF SUMMARY

A first objective of the present invention is to provide an angle adjustment device for disc sections for agricultural harrows that consolidates both angle adjustments in the horizontal and transverse planes, in order to facilitate and speed up the operator's work to adapt the harrow to the soil profile to be worked.

A second objective of the present invention is to provide a device for adjusting the angle of disc sections for agricultural harrows that comprises a simplified constructive arrangement for acting on the disc carrier beams with respect to the main structure.

The present invention deals with an angle adjustment device for disc sections for agricultural harrows comprising at least one articulation element configured to be pivotally attached to a beam of an agricultural harrow, the articulating element being configured to be pivotally attached to an adjustment shaft.

In one possible embodiment, the articulating element comprises at least one first hole arranged vertically in its frame and at least one second hole disposed horizontally in its frame.

In another possible embodiment, the first hole is configured to receive the adjustment shaft and the second hole is configured to receive an association element of the device with one of the beams.

In another possible embodiment, the adjustment shaft is a partially threaded shaft associated with at least one pair of adjustment nuts.

In another possible embodiment, the device comprises a support structure provided with an upper plate and a lower plate attached to each other by at least one fastening element.

In another possible embodiment, a first adjustment nut is arranged on the upper plate and a second adjustment nut is arranged under the lower plate.

In another possible embodiment, the support structure is supported on a structural element of the agricultural harrow.

In another possible embodiment, the device comprises a graduated scale associated with the adjustment shaft.

In another possible embodiment, the lower plate is associated with a crank.

The present invention further contemplates an agricultural harrow characterized in that it comprises an angle adjustment device for disc sections such as the aforementioned in any of its embodiments, taken individually or in combination.

BRIEF DESCRIPTION OF THE FIGURES

The present invention will be described in more detail below, based on an example of execution shown in the drawings. The figures show.

DETAILED DESCRIPTION OF VARIOUS EMBODIMENTS

Initially, it should be noted that the term "preferred" used here should not be understood as mandatory or imperative, but rather to characterize an embodiment of particular efficiency of the invention among the multiple possible ones.

Figure 1:
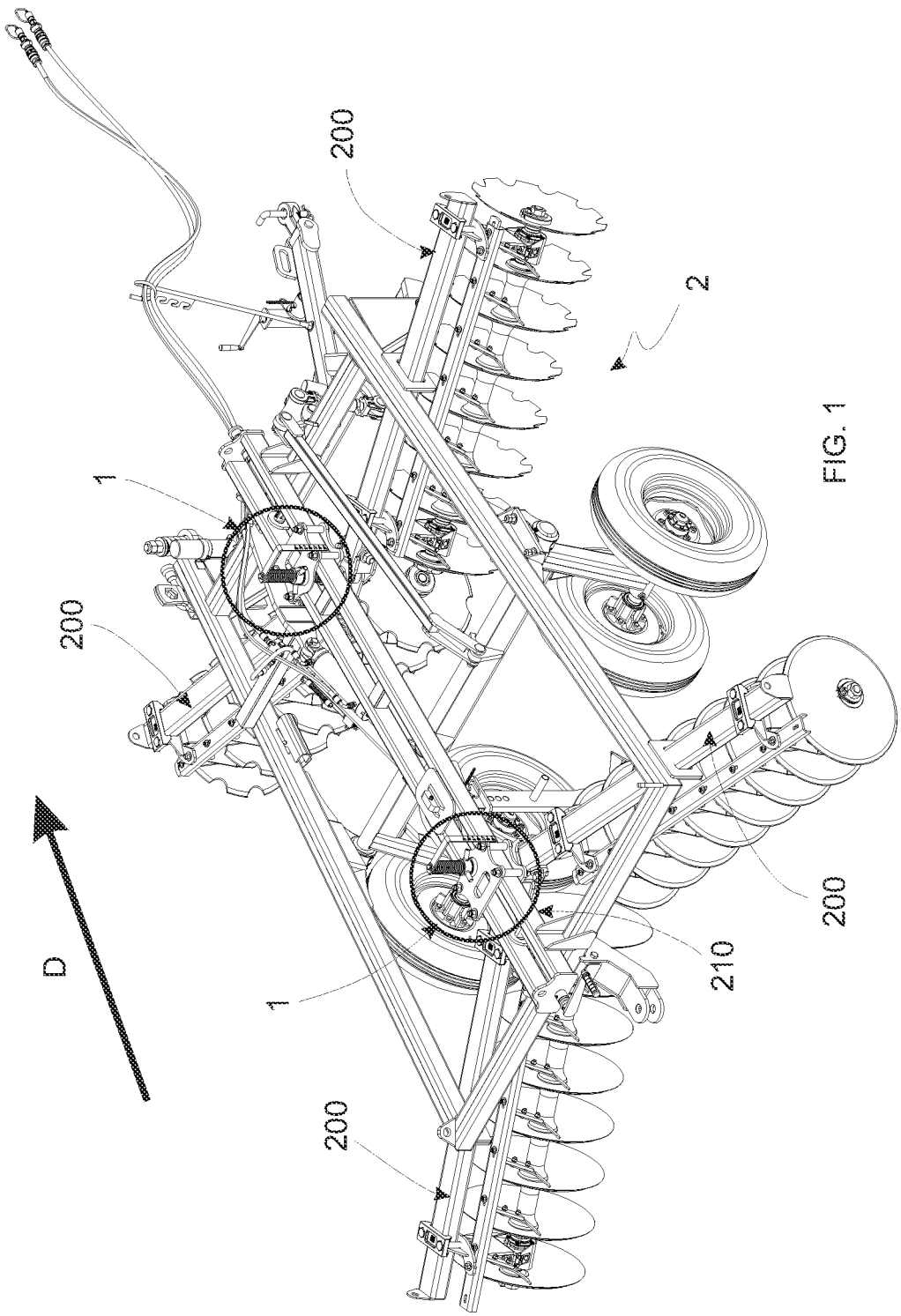
FIG. 1—is a perspective view of the agricultural harrow of the present invention in its preferred configuration, and containing the adjustment device of the present invention in its preferred configuration.

That said, FIG. 1 discloses the agricultural harrow 2 of the present invention containing the adjustment device 1 of the present invention, both in preferred embodiments. It is observed that the agricultural harrow 2 comprises, among other structural and functional elements and components, beams 200 to which the sets of soil cutting discs are associated. Such beams 200 are those whose angles in the horizontal and transverse/vertical planes will be adjusted by the adjustment device 1 of the present invention.

By way of clarification, the terms "horizontal", "vertical", "transverse" and other terms indicative of direction used herein should be taken in relation to the ground and in relation to the course of displacement of agricultural harrow 2 during its operation, such as indicates the arrow "D" in FIG. 1.

Figure 2:
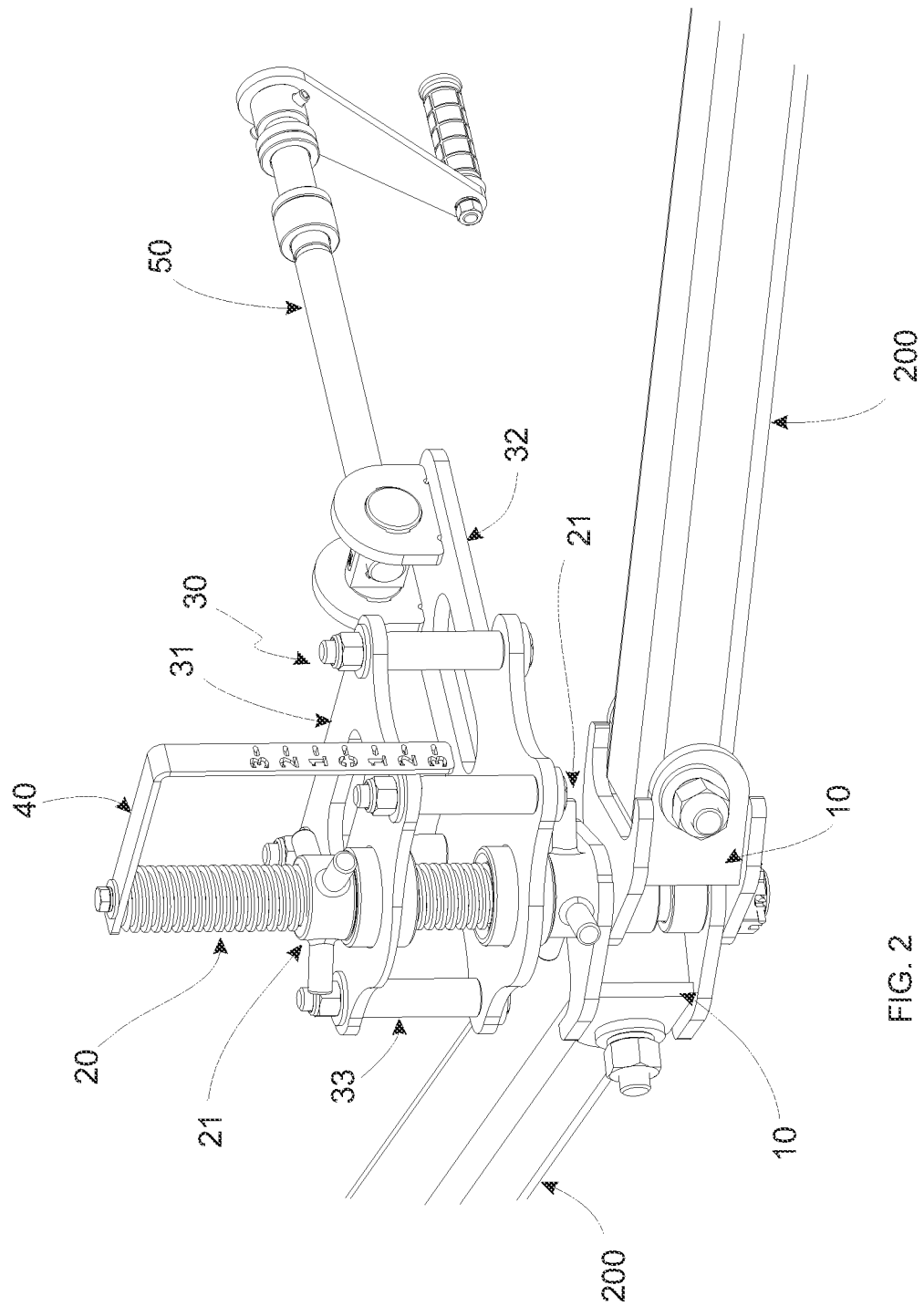
FIG. 2—is a perspective view of the adjustment device of the present invention in a preferred configuration.
Figure 3:
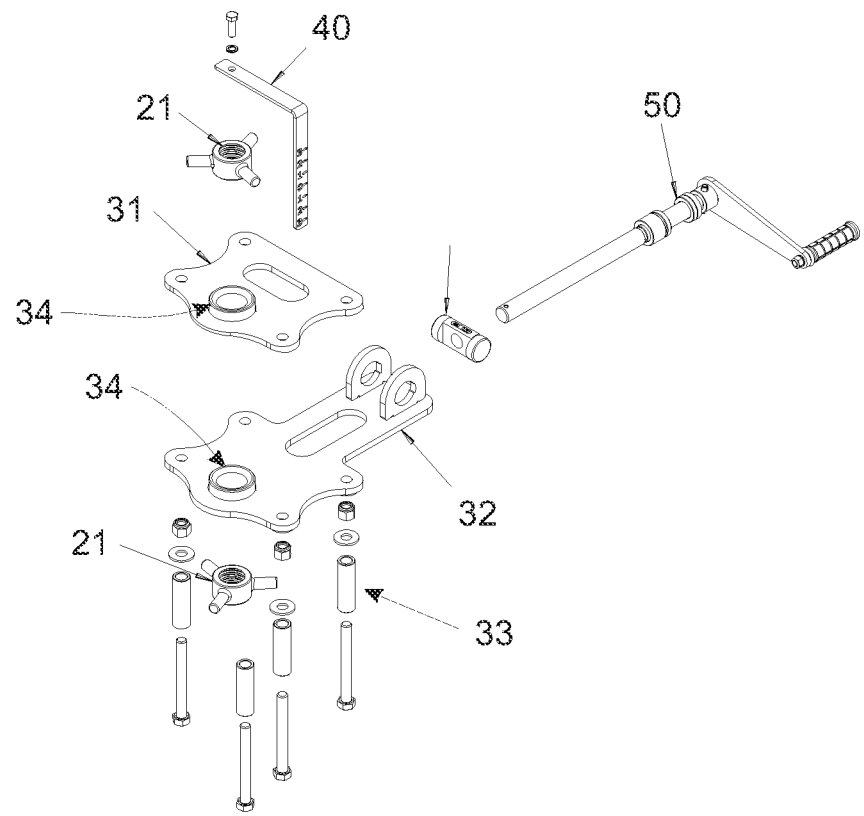
FIG. 3—is an exploded perspective view of the adjustment device of the present invention in a preferred configuration.
Figure 3:
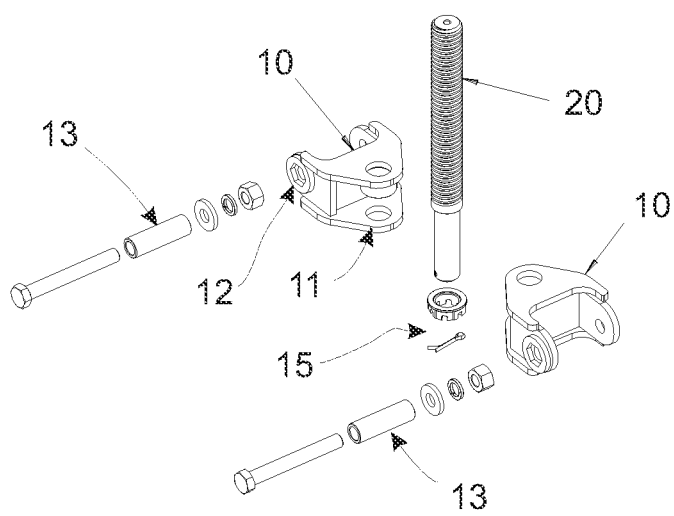

FIGS. 2 and 3 disclose in more detail the construction of the adjustment device 1 of disc sections of the agricultural harrow 2 in an embodiment considered to be preferred. It is observed that the device 1 comprises at least one articulation element 10 configured to be pivotally attached to a beam 200 of an agricultural harrow 2, the articulation element 10 being configured to be pivotally attached to an adjustment shaft 20.

This means that the beams 200 are associated with the articulation element 10 configuring a relative articulation movement between these two elements in a transverse or vertical plane, while the articulation element 10 is, in turn, associated with the adjustment shaft 20 configuring a relative movement of articulation or rotation in a horizontal plane between these two elements, and consequently between the adjustment shaft 20 and the beams 200. The movement of beams 200 in relation to device 1 can be better seen in FIGS. 5 to 8. Such relative movements are provided by at least one articulating element 10. In this preferred embodiment, two hinge elements 10 are used, one for each beam 200 that is connected to device 1. Preferably, device 1 comprises a hinge element 10 for each beam 200 connected to device 1.

The articulation element 10 is of any type that allows the connection of the device 1 to the beams 200 maintaining a relative freedom of movement between them both in a horizontal plane and in a transverse plane. Preferably, the hinge element 10 comprises at least one first hole 11 disposed vertically in its frame and at least one second hole 12 disposed horizontally in its frame. More preferably, the first and second holes 11, 12 are through, the first hole 11 being configured to receive the adjustment shaft 20 and the second hole 12 being configured to receive the beams 200 through an association member 13 of the device 1, for example, a bolt, nut, and bushing assembly, as seen more clearly in FIG. 3.

In this way, the device 1 is able to be associated with the beams 200 so that they remain articulated/rotatable with respect to said device 1 both in a horizontal plane and in a transverse plane. More preferably, the articulation element 1 may comprise two "U" or "C" shaped profiles arranged with their concavities facing each other and rotated to each other at an angle of 90°, in order to configure two "hooks" oppositely faced and angled at 90°, and the first and second holes 11, 12 being arranged through the ends of each "hook".

Figure 4:
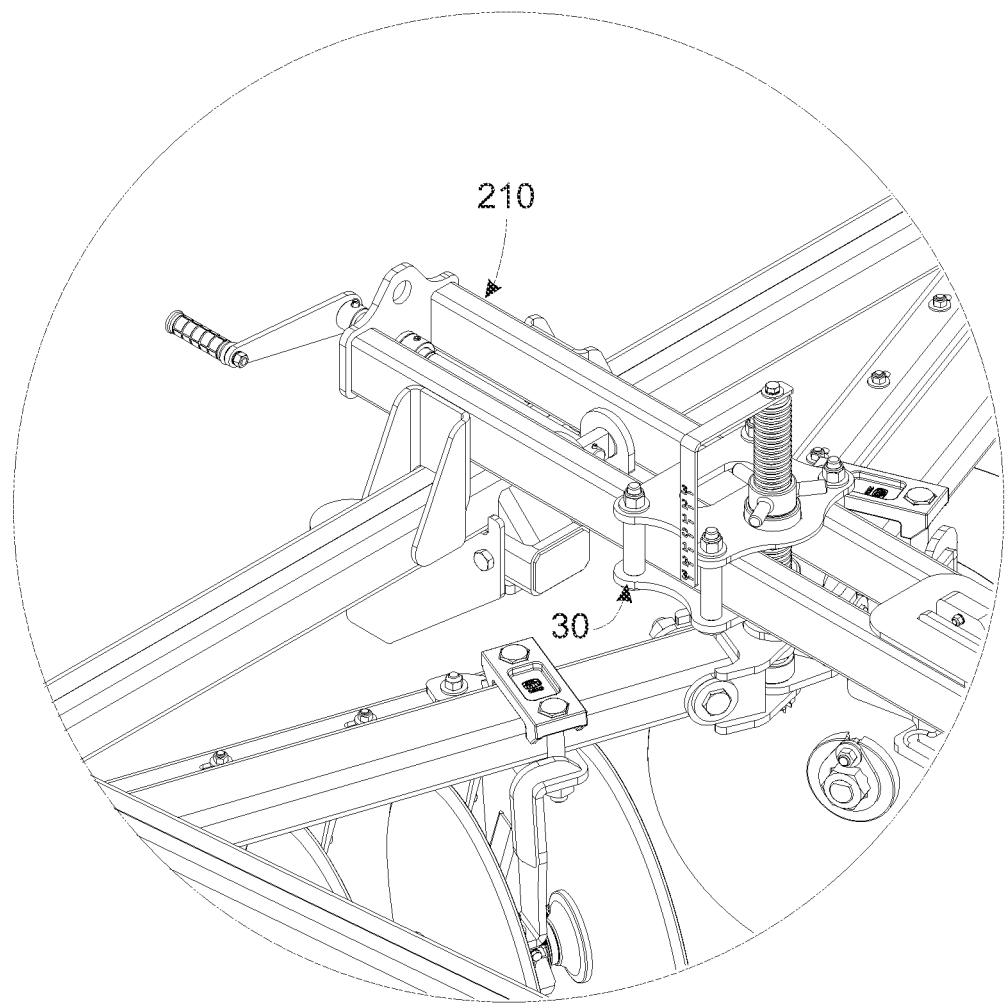
FIG. 4—is a perspective detail of the agricultural harrow of the present invention containing the adjustment device of the present invention.

In one possible embodiment, the adjustment shaft 20 is a partially threaded shaft associated with at least one pair of adjustment nuts 21. As seen in FIGS. 2, 3 and 4, the shaft 20 has at least one threaded portion that receives a pair of adjustment nuts 21. Such adjustment nuts 21 are intended to allow the adjustment of the height of the device 1 in relation to a structural element 210 of the agricultural harrow 2 and, consequently, to allow the angle adjustment of beams 200 in the transverse plane, as will be explained in more detail below.

Figure 7:
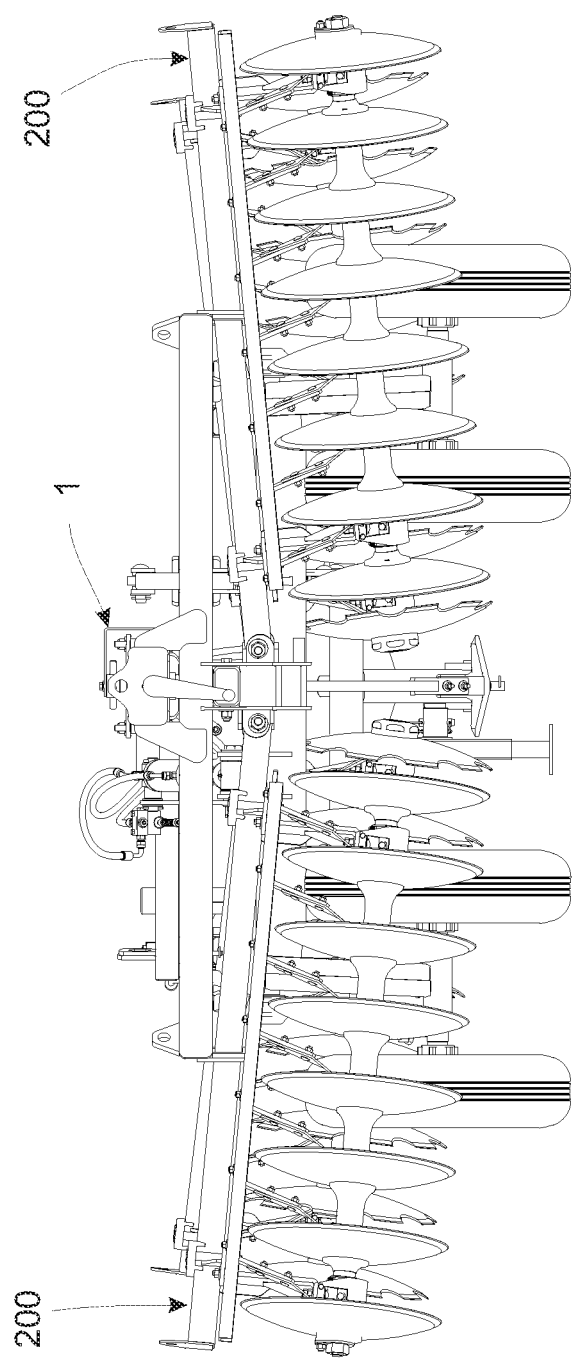
FIG. 7—is a back view of the agricultural harrow of the present invention detailing a first angular positioning of its beams in the transverse plane.
Figure 8:
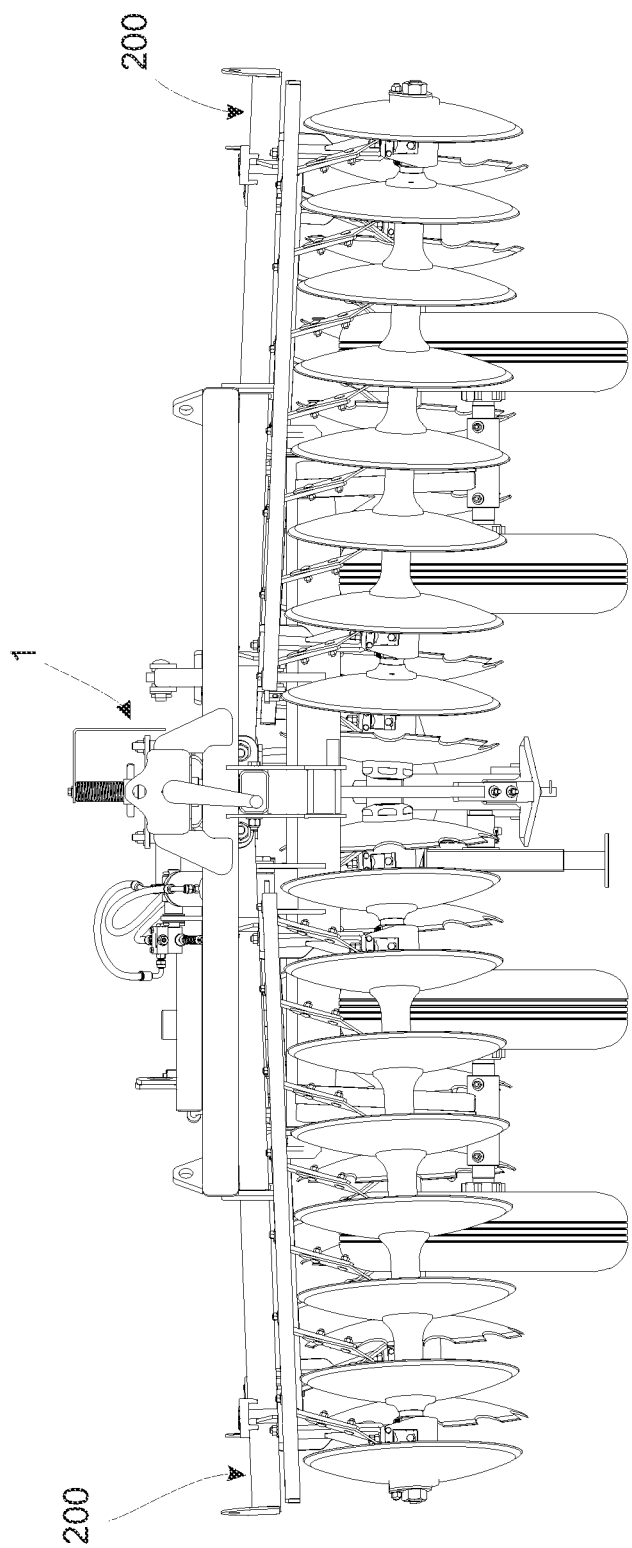
FIG. 8—is a back view of the agricultural harrow of the present invention detailing a second angular positioning of its beams in the transverse plane.

In another possible embodiment, the device comprises a support structure 30 provided with an upper plate 31 and a lower plate 32 attached to each other by at least one fastening element 33. Such lower and upper plates 31, 32 preferably have openings or holes 34 for passage of the adjustment shaft 20. The adjustment nuts 21 are positioned on the external portions of the lower and upper plates 31, 32, that is, a first adjustment nut 21 is disposed on the upper plate 31 and a second adjustment nut 21 is disposed under the lower plate 32. Therefore, to adjust the angle of the beams 200 in the vertical or transverse plane, as seen in FIGS. 7 and 8, the upper and lower adjustment nuts 21 are manipulated to move the adjustment shaft 20 in the vertical direction, up or down, causing the beams 200 to pivot or rotate relative to the pivot element 10 to assume the desired working angle.

In this sense, in a possible embodiment, the support structure 30 is supported on a structural element 210 of the agricultural harrow 2, so that the movement of the adjustment shaft 20 when angling the beams 200 does not affect the support structure 30, which it remains stationary and at the level of the structural element 210, thus serving as a support for the device 1 during its adjustment. The structural element 210 of the agricultural harrow 2 can be a structural beam of its chassis that remains fixed during its operation, for example, the center beam 210 seen in FIG. 1.

Regarding the adjustment in the horizontal plane of the beams 200, it is carried out by the articulation/rotation of the beams 200 around the adjustment shaft 20. It can be seen from FIG. 2, for example, that the portion of the adjustment shaft 20 that connects with the pivot element 10 is not threaded, such that a rotational movement is possible between them and, consequently, a freedom of rotation between the adjustment shaft 20 and the beams 200, allowing a degree of angulation of the beams 200 in the horizontal plane. In one possible embodiment, locking the rotation of the articulation elements 10 with respect to the adjustment shaft 20 is performed by a nut and pin assembly 15.

In another possible embodiment, the device 1 further comprises a graduated scale associated with the adjustment shaft 20. The graduated scale 40 preferably comprises an "L" shape, having an end associated with the top of the adjustment shaft 20. The other portion of the graduated scale 40 which is perpendicular to the end associated with the adjustment shaft 20 is disposed adjacent to the support structure 30 so that, upon vertical adjustment of the adjustment shaft 20, the graduated scale 40 follows the vertical movement of the adjustment shaft 20 allowing a visual comparison of its graduated portion with the position of the support structure 30 which remains static, thus ensuring an adequate level of precision in the adjustment of the vertical angle of the beams 200.

Figure 5:
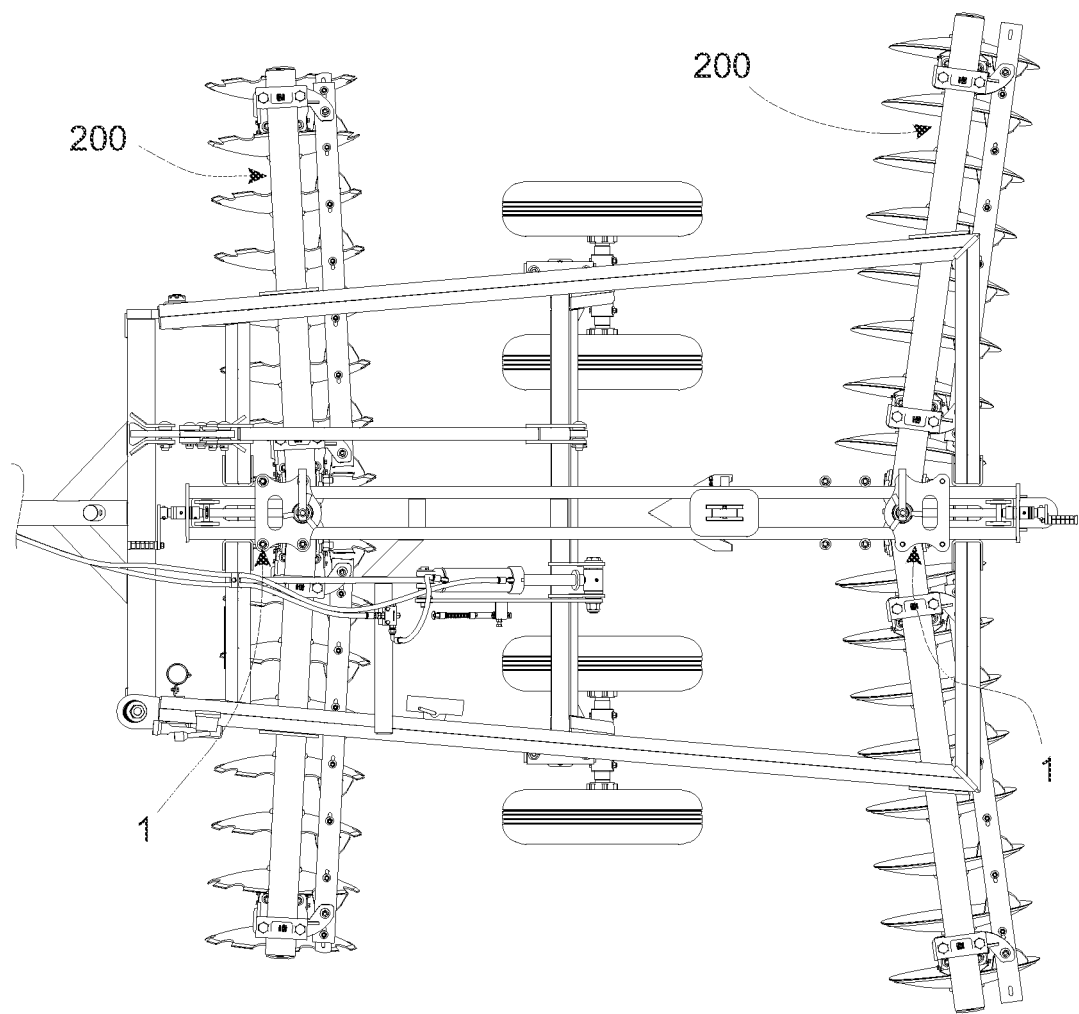
FIG. 5—is a top view of the agricultural harrow of the present invention detailing a first angular positioning of its beams in the horizontal plane.
Figure 6:
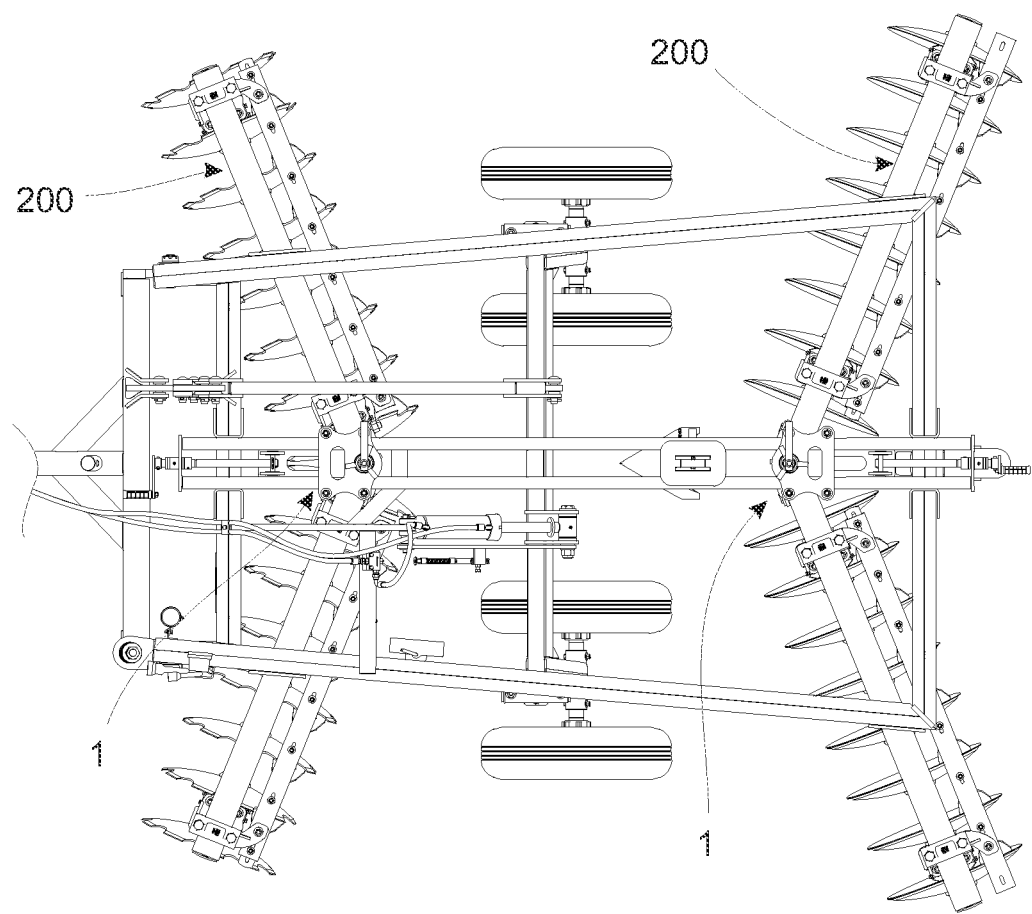
FIG. 6—is a top view of the agricultural harrow of the present invention detailing a second angular positioning of its beams in the horizontal plane.

Still in a preferred embodiment, the lower plate 32 is associated with a crank 50. The cranks 50 function as an element to allow operator manipulation when changing the angle of the disc sections in the horizontal (or longitudinal) plane as illustrated in FIGS. 5 and 6. The crank 50 has one end supported on the structural element 210, and causes the other end of the crank to move the beams 200; this through the bottom plate 32; of the fixing elements 33 and of the adjustment shaft 20 whose lower end is associated with the articulation elements 10 and the beams 200.

In this way, the device 1 of the present invention is able to allow the angular adjustment of the beams 200 of the sections of the agricultural harrow 2 both in a horizontal plane and in a vertical/transverse plane. Furthermore, said device 1 comprises a simple construction when compared to existing solutions in the state of the art, making use of few components to allow both adjustments. Not only that, the operation for adjusting the angles using device 1 is simple, practical and fast, requiring few manipulation steps. Furthermore, the constructive form of the elements involved is able to work with locks and fittings with minimal gaps between components, allowing satisfactory performance at higher working speeds.

In accordance with the aforementioned device 1, the present invention also contemplates an agricultural harrow 2 provided with said device 1 in any of its possible embodiments taken individually or in combination.

Having described an example of preferred embodiment, it should be understood that the scope of the present invention encompasses other possible variations, being limited solely by the content of the appended claims, including possible equivalents therein.

The invention claimed is:

1. A device (1) for adjusting the angle of disc sections for agricultural harrows, said device comprising at least one articulation element (10) having at least one first hole (11) disposed vertically in its structure and at least one second hole (12) disposed horizontally in its structure, the horizontal disposition of the at least one second hole (12) being configured to pivotally attach the at least one articulation element (10) to a beam (200) of an agricultural harrow (2), the vertical disposition of the least one first hole (11) being configured to pivotally attach the at least one articulation element (10) to an adjustment shaft (20), an axis of the at least one first and second holes (11, 12) being perpendicular to a longitudinal axis of the beam (200).

2. The device (1) according to claim 1, wherein the at least one first hole (11) and the at least one second hole (12) each comprise a pair of first and second holes, respectively.

3. The device (1) according to claim 1, wherein the first hole (11) is configured to receive the adjustment shaft (20) and the second hole (12) is configured for receiving an association element (13) of the device (1) with one of the beams (200).

4. The device (1) according to claim 1, wherein the adjustment shaft (20) is a partially threaded shaft associated with at least one pair of adjustment nuts (21).

5. The device (1) according to claim 4, wherein a first adjustment nut (21) is arranged on the upper plate (31) and a second adjusting nut (21) is located under the lower plate (32).

6. Device (1) according to claim 1, further comprising a support structure (30) provided with an upper plate (31) and a lower plate (32) attached to each other by at least one fastening element (33), the upper and lower plates (31, 32) each having at least one hole (34) configured to receive the adjustment shaft (20) for positioning of the support structure (30) adjacent the articulation element (10).

7. The device (1) according to claim 6, wherein a first adjustment nut (21) is arranged on the upper plate (31) and a second adjusting nut (21) is located under the lower plate (32).

8. The device (1) according to claim 6, wherein the support structure (30) is supported on a structural element (210) of the agricultural harrow (2).

9. The device (1) according to claim 6, wherein the lower plate (32) is associated with a crank (50).

10. The device (1) according to claim 1, further comprising a graduated scale (40) associated with the adjustment shaft (20).

11. An agricultural harrow (2) comprising the device (1) of claim 1.

* * * * *

UNITED STATES PATENT AND TRADEMARK OFFICE
CERTIFICATE OF CORRECTION

PATENT NO. : 12,144,274 B2
APPLICATION NO. : 17/558792
DATED : November 19, 2024
INVENTOR(S) : Sebastião Antonio Jacomine et al.

It is certified that error appears in the above-identified patent and that said Letters Patent is hereby corrected as shown below:

In the Claims

In Column 6, approx. Line 12, Claim 6, delete "Device (1)" and insert -- The device (1) --, therefor.

Signed and Sealed this
Eighteenth Day of March, 2025

Coke Morgan Stewart
*Acting Director of the United States Patent and Trademark Office*